US012636908B2

(12) United States Patent
Jeong

(10) Patent No.: US 12,636,908 B2
(45) Date of Patent: May 26, 2026

(54) DRIVE AXLE ASSEMBLY

(71) Applicant: HYUNDAI WIA Corporation, Gyeongsangnam-do (KR)

(72) Inventor: Chang Hee Jeong, Gyeonggi-do (KR)

(73) Assignee: HYUNDAI WIA CORPORATION, Gyeongsangnam-Do (KR)

( * ) Notice: Subject to any disclaimer, the term of this patent is extended or adjusted under 35 U.S.C. 154(b) by 446 days.

(21) Appl. No.: 17/963,580

(22) Filed: Oct. 11, 2022

(65) Prior Publication Data

US 2023/0123906 A1 Apr. 20, 2023

(30) Foreign Application Priority Data

Oct. 19, 2021 (KR) ......................... 10-2021-0139469

(51) Int. Cl.
B60B 27/00 (2006.01)

(52) U.S. Cl.
CPC ...... B60B 27/0005 (2013.01); B60B 27/0073 (2013.01); *F16C 2240/80* (2013.01); *F16C 2326/02* (2013.01)

(58) Field of Classification Search
CPC ............. B60B 27/0005; B60B 27/0073; F16C 2240/80; F16C 2326/02
USPC ........................... 464/178; 384/475, 544, 589
See application file for complete search history.

(56) References Cited

U.S. PATENT DOCUMENTS

| | | | | |
|---|---|---|---|---|
| 3,167,364 | A | * | 1/1965 | Dunn ...................... F16C 25/06 |
| 5,695,202 | A | * | 12/1997 | Cartwright ............... B62D 1/20 |
| | | | | 277/636 |
| 7,419,434 | B2 | * | 9/2008 | Wormsbaecher .... B60K 17/344 |
| | | | | 464/178 |
| 11,619,271 | B2 | * | 4/2023 | Yoo ...................... F16D 3/2245 |
| 2015/0266340 | A1 | | 9/2015 | Park et al. |
| 2017/0204898 | A1 | | 7/2017 | Tomogami |
| 2022/0410624 | A1 | * | 12/2022 | Yoo .......................... F16D 3/22 |

FOREIGN PATENT DOCUMENTS

| | | | | |
|---|---|---|---|---|
| CN | 101346553 | A | | 1/2009 |
| CN | 205841509 | U | | 12/2016 |
| CN | 111959204 | A | | 11/2020 |
| GB | 899511 | A | * | 6/1962 ............. F16D 3/841 |
| JP | H01128024 | A | | 5/1989 |
| JP | 2007315423 | | | 12/2007 |
| JP | 2013068245 | | | 4/2013 |

* cited by examiner

*Primary Examiner* — Greg Binda
(74) *Attorney, Agent, or Firm* — Dickinson Wright PLLC

(57) ABSTRACT

A drive axle assembly provides a maximum bending angle by way of a structure of a shaft bearing supported by a drive shaft with a compact assembly structure. The drive axle assembly is preferably configured to include, a wheel bearing assembled to an axle housing, a boot having a large diameter portion of one end connected to an outer ring of the wheel bearing, a drive shaft having an orbit formed along a circumferential direction of an outer circumferential surface, and a shaft bearing assembled between a small diameter portion of the other end of the boot and the drive shaft, and configured to restrict the rotation of the boot as a rolling element is rotated along the orbit.

19 Claims, 3 Drawing Sheets

DRIVE AXLE ASSEMBLY

CROSS REFERENCE TO RELATED APPLICATION

The present application claims priority of Korean Patent Application No. 10-2021-0139469 filed Oct. 19, 2021, the entire contents of which is incorporated herein for all purposes by this reference.

BACKGROUND

Field

The present disclosure relates to a drive axle assembly, which increases a maximum bending angle by improving a structure of a shaft bearing supported by a drive shaft and makes an assembly structure compact.

Description of the Related Art

An integrated drive axle (IDA) has a structure of integrating a hub in which a drive shaft and a wheel bearing are assembled.

In other words, the functions of the wheel bearing and the drive shaft are integrated, so that there are advantages in that it is possible to reduce costs of products together with reducing weights of the products, and also to increase a bending angle of the drive shaft by reducing a center distance of a joint, and it is possible to increase lateral stiffness of a vehicle by increasing a PCD of the wheel bearing.

Meanwhile, the drive axle functions to transmit a rotational driving force of a powertrain provided from an inboard side to the disk/wheel connected to an outboard side through the drive shaft.

However, when the drive shaft is rotated, a boot is also rotated, so that there is a problem in that wrinkles of the boot are continuously folded and unfolded in a circumferential direction in traveling situations including full-turn traveling, and in this process, dirt/snow removal agent and the like inside the wrinkles of the boot come into contact with moisture to repeatedly stick or fall off, thereby generating a frictional sound.

To solve this problem, a shaft bearing is mounted between the boot and the drive shaft so that the boot is rotated relatively with respect to the drive shaft, and thus the boot is not rotated.

However, as the shaft bearing is mounted between the boot and the drive shaft, the size of an outer diameter of the shaft bearing portion is increased, and we have discovered that the maximum bending angle is reduced, resulting in a problem in that a configuration of a package becomes disadvantageous.

The matters explained as the background art are for the purpose of enhancing the understanding of the background of the present disclosure and should not be taken as acknowledging that they correspond to the related art already known to those skilled in the art.

SUMMARY OF THE DISCLOSURE

The present disclosure has been made in efforts to solve the above problems, and an object of the present disclosure is to provide a drive axle assembly, which increases a maximum bending angle by improving a structure of a shaft bearing supported by a drive shaft, and makes an assembly structure compact.

The present disclosure provides a drive axle assembly including: a wheel bearing assembled to an axle housing; a boot having a large diameter portion of one end connected to an outer ring of the wheel bearing; a drive shaft having an orbit formed along a circumferential direction of an outer circumferential surface; and a shaft bearing assembled between a small diameter portion of the other end of the boot and the drive shaft, and configured to restrict the rotation of the boot as a rolling element is rotated along the orbit.

The orbit may be formed on the drive shaft in a groove shape.

The orbit may be formed on the drive shaft in a groove shape corresponding to a shape of an outer surface of the rolling element.

The rolling element of the shaft bearing may come into direct contact with the orbit.

A lubrication groove may be formed along the orbit.

The lubrication groove may be formed in a straight shape along the orbit.

The lubrication groove may be formed in a zigzag shape along the orbit.

A shaft seal may be assembled to an inboard side of the shaft bearing to block foreign matters from being introduced into the boot.

The shaft seal may be assembled between the small diameter portion of the other end of the boot and the drive shaft.

The shaft seal may be assembled between an outer ring of the shaft bearing and the drive shaft.

A knuckle may be fixed to the outer ring of the wheel bearing, and a large diameter portion of the boot may be assembled to the knuckle.

A ratio of a length of a PCD of the shaft bearing to a minimum outer diameter of the drive shaft may be as in Equation 1 below.

$$1.0 \leq D/d \leq 1.5 \qquad \text{Equation 1}$$

D: Minimum outer diameter of the drive shaft
d: PCD of the shaft bearing

A ratio of a length from an end of an outboard side of the shaft bearing up to a center of the rolling element of the shaft bearing to a length from an inflection point of an outer diameter of the outboard side of the drive shaft to which the shaft bearing is assembled up to the center of the rolling element of the shaft bearing may be as in Equation 2 below.

$$0.75 \leq B/b \leq 1.0 \qquad \text{Equation 2}$$

B: Length from the end of the outboard side of the shaft bearing up to the center of the rolling element of the shaft bearing
b: Length from the inflection point of the outer diameter of the outboard side of the drive shaft to which the shaft bearing is assembled up to the center of the rolling element of the shaft bearing.

According to the present disclosure through the above configuration, it is possible to reduce the outer diameter of the shaft bearing by the length at which the inner ring has been removed by removing the inner ring of the shaft bearing and replacing the inner ring with the orbit formed on the drive shaft.

Accordingly, it is possible to increase the maximum bending angle of the constant velocity joint by increasing the bending angle at which the shaft bearing interferes with the surrounding parts, and make the assembly structure of the shaft seal together with the shaft bearing compact, and it is also possible to reduce the cost and weight of the axle assembly by reducing the number of parts as the inner ring of the shaft bearing has been removed.

In addition, the boot is not rotated when the drive shaft is rotated, and thus the operation in which the winkles of the boot is continuously folded and unfolded in the circumferential direction does not occur. Accordingly, it is possible to prevent a frictional noise generated from the wrinkle portion while traveling.

BRIEF DESCRIPTION OF THE DRAWINGS

The above and other objects, features and other advantages of the present disclosure will be clearly understood from the following detailed description when taken in conjunction with the accompanying drawings, in which.

DETAILED DESCRIPTION

Figure 1:
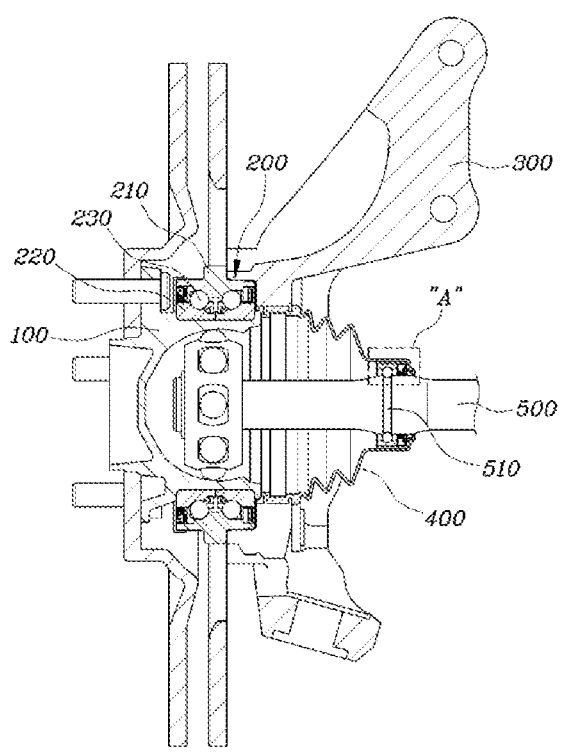
FIG. 1 is a cross-sectional view showing a structure of a drive axle assembly according to the present disclosure.

Specific structural or functional descriptions for exemplary embodiments of the present disclosure disclosed in the present specification or application are only exemplified for the purpose of describing the exemplary embodiments according to the present disclosure, and the exemplary embodiments according to the present disclosure may be carried out in various forms and should not be interpreted as being limited to the exemplary embodiments described in the present specification or application.

Since the exemplary embodiment according to the present disclosure may have various changes and have various forms, specific exemplary embodiments will be shown in the drawings and described in detail in the present specification or application. However, this is not intended to limit the exemplary embodiments according to the concept of the present disclosure to a specific disclosed form, and should be understood to include all changes, equivalents, or substitutes included in the spirit and technical scope of the present disclosure.

Terms such as first and/or second may be used to describe various components, but the components should not be limited to the terms. The terms are used only for the purpose of distinguishing one component from other components, and for example, a first component may be referred to as a second component, and similarly, the second component may also be referred to as the first component, without departing from the scope according to the concept of the present disclosure.

When a certain component is said to be "connected" or "coupled" to another component, it should be understood that the certain component may be directly connected or coupled to another component, but other components may also exist therebetween. On the other hand, when a certain component is said to be "directly connected to" or "directly coupled to" another component, it should be understood that other components do not exist therebetween. Other expressions for describing the relationship between components, that is, expressions such as "between" and "directly between" or "adjacent to" and "directly adjacent to" should also be interpreted in the same manner.

The terms used in the present specification are only used to describe the specific exemplary embodiments and are not intended to limit the present disclosure. The singular expression also includes the plural expression unless otherwise specified in the context. It should be understood that terms such as "comprises" or "has" used in the present specification specify the presence of the practiced feature, number, step, operation, component, part, or a combination thereof, and do not exclude the presence or addition possibility of one or more other features, numbers, steps, operations, components, parts, or a combination thereof in advance.

Unless defined otherwise, all terms used herein, including technical or scientific terms, have the same meaning as commonly understood by those skilled in the art to which the present disclosure pertains. Terms such as those defined in commonly used dictionaries should be interpreted as having meanings consistent with the meanings in the context of the related art, and are not interpreted as an ideal or excessively formal meaning unless explicitly defined in the present specification.

Preferred embodiments of the present disclosure will be described in detail with reference to the accompanying drawings.

FIG. 1 is a cross-sectional view showing a structure of a drive axle assembly according to the present disclosure.

Describing with reference to FIG. 1, the drive axle assembly according to the present disclosure is designed based on an integrated drive axle (IDA), and an outer ring 210 of a wheel bearing 200 is fixed to a knuckle 300 or a carrier, an inner ring 220 of the wheel bearing 200 is fitted into the axle housing 100, and the wheel bearing 200 is inserted into an outer circumferential surface of the axle housing 100 in which a ball 230 (or roller) and a cage are assembled and integrated between the outer ring 210 and the inner ring 220 of the wheel bearing 200.

In addition, by performing an orbital forming process for an end 110 of the axle housing 100 toward an inboard side to form the end 110 of the axle housing 100 in a shape rolling up outward, the inner ring 220 is fixed to the axle housing 100 by applying a pre-load to the wheel bearing 200.

In addition, an end of a drive shaft 500 is connected to an inside of the axle housing 100 through a constant velocity joint at an outboard side, and thus a driving force of a powertrain provided from the inboard side is transmitted to the constant velocity joint through the drive shaft 500, and the axle housing 100 is rotated as the constant velocity joint is moved and bent according to the behavior of the vehicle.

Meanwhile, as a characteristic technical configuration of the present disclosure, a boot 400 is assembled in a structure in which rotation is restricted between the outer ring 210 of the wheel bearing 200 and the drive shaft 500.

Figure 2:
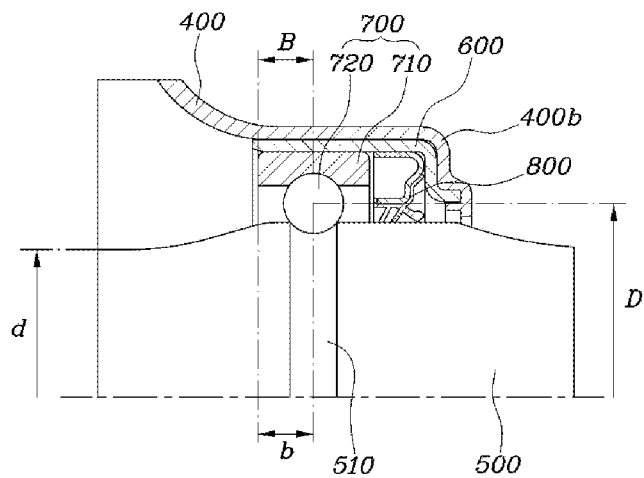
FIG. 2 is an enlarged view of portion 'A' in FIG. 1.

FIG. 2 is an enlarged view of portion 'A' in FIG. 1, and referring to FIG. 2, the drive axle assembly is configured to include the wheel bearing 200 assembled to the axle housing 100; the boot 400 having a large diameter portion 400a of one end connected to the outer ring 210 of the wheel bearing 200; the drive shaft 500 having an orbit 510 formed in a circumferential direction of an outer circumferential surface; and a shaft bearing 700 assembled between a small diameter portion 400b of the other end of the boot 400 and the drive shaft 500, and configured to restrict the rotation of the boot 400 as a rolling element 720 is rotated along the orbit 510.

For example, an end of the knuckle 300 is assembled in a shape that surrounds a part of the outer ring 210 formed at the inboard side, and the large diameter portion 400a of the boot 400 is assembled inside the knuckle 300.

In addition, the shaft bearing 700 is provided in a shape that surrounds the drive shaft 500 between the small diameter portion 400b of the boot 400 and the drive shaft 500, so that the relative rotation of the drive shaft 500 with respect to the boot 400 is allowed, and thus the boot 400 maintains a state of being fixed without rotation.

In particular, since the shaft bearing 700 is formed in a ball bearing type composed of only an outer ring 710 and the rolling element 720 without the inner ring, the orbit 510 formed on the drive shaft 500 functions as the inner ring and thus the ball, which is the rolling element 720 of the shaft bearing 700, is rotated along the orbit 510.

As described above, according to the present disclosure, the boot 400 does not rotate when the drive shaft 500 is rotated, so that an operation in which the wrinkle of the boot 400 is continuously folded and unfolded in the circumferential direction in a traveling situation does not occur, thereby preventing a frictional noise generated from the wrinkle portion while traveling.

In particular, the inner ring of the shaft bearing 700 is removed and the orbit 510 formed on the drive shaft 500 replaces the inner ring, so that the outer diameter of the shaft bearing 700 is reduced by a length at which the inner ring is removed.

Accordingly, the shaft bearing 700 may increase the maximum bending angle of the constant velocity joint by increasing the bending angle at which the shaft bearing 700 interferes with the surrounding parts, and make an assembly structure of a shaft seal 800 to be described below compact together with the shaft bearing 700.

In addition, as the inner ring of the shaft bearing 700 is removed, it is possible to reduce the cost and weight of the axle assembly by reducing the number of parts.

For reference, the shaft bearing 700 may be applied in a needle bearing or a roller bearing type in addition to the ball bearing type, and in this case, the rolling element 720 may be a needle or a roller.

As described above, when the rolling element 720 is the needle or the roller, a radial length of the bearing is relatively reduced compared to that of the ball, thereby reducing the diameter of the shaft bearing 700, and thus the size of the small diameter portion 400b of the boot 400 is reduced, thereby further making the assembly structure of the drive axle assembly compact.

In addition, as shown in FIG. 2, the orbit 510 may be formed on the drive shaft 500 in a groove shape.

In other words, the orbit 510 having an arc-shaped recessed cross-sectional shape is formed in the circumferential direction of the outer circumferential surface of the drive shaft 500.

Accordingly, when the drive shaft 500 rotates in a state in which a part of the rolling element 720 is inserted into the orbit 510, the rolling element 720 rotates along the orbit 510 to support the drive shaft 500.

In particular, the orbit 510 may be formed on the drive shaft 500 in a groove shape corresponding to the outer surface shape of the rolling element 720.

In other words, the orbit 510 is formed in a shape corresponding to the shape of the outer surface of the ball applied to the shaft bearing 700. Accordingly, when the drive shaft 500 rotates in a state in which the outer surface of the ball is fully supported by an inner surface of the orbit 510, the ball rotates along the orbit 510 to support the drive shaft 500.

In addition, the present disclosure provides a structure in which the rolling element 720 of the shaft bearing 700 comes into direct contact with the orbit 510.

In other words, as described above, as the inner ring of the shaft bearing 700 is removed, the orbit 510 takes over the role of the inner ring, and thus the ball comes into direct contact with and is supported by the orbit 510 formed on the drive shaft 500.

Figure 3:
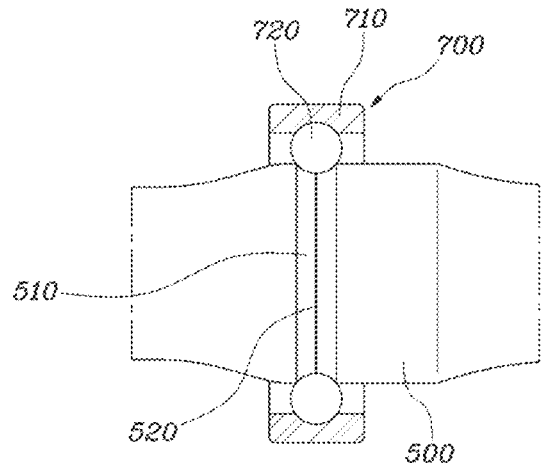
FIG. 3 is a view showing a lubrication groove formed on a drive shaft according to the present disclosure.

Meanwhile, FIG. 3 is a view showing a lubrication groove 520 formed on the drive shaft 500 according to the present disclosure.

Referring to FIG. 3, the lubrication groove 520 may be formed along the orbit 510.

For example, by forming a ring-shaped lubrication groove 520 in the circumferential direction along the inner surface of the groove that forms the orbit 510, a lubricant such as grease is stored in the lubrication groove 520, thereby improving lubrication performance of the rolling element 720.

As an embodiment in which the lubricating groove 520 is formed, as shown in FIG. 3, the lubricating groove 520 may be formed in a straight shape along the orbit 510.

In addition, as another embodiment in which the lubrication groove 520 is formed, the lubrication groove 520 may be formed in a zigzag shape along the orbit 510.

In other words, although not shown in the drawing, the lubrication groove 520 may be formed in the zigzag shape in left and right directions along the inner surface of the orbit 510, and the lubrication groove 520 formed in the zigzag shape has an increased amount of stored lubricant compared to the lubrication groove 520 straightly formed without being bent, thereby further improving the lubrication performance of the rolling element 720.

Meanwhile, in the present disclosure, the shaft seal 800 may be configured to be assembled to the inboard side of the shaft bearing 700 to prevent foreign matters from being introduced into the boot 400.

As one exemplary structure in which the shaft seal 800 is assembled, the shaft seal 800 may be assembled between the drive shaft 500 and the small diameter portion 400b of the other end of the boot 400.

For example, a bearing housing 600 is press-fitted and assembled to an inner circumferential surface of the small diameter portion 400b of the boot 400.

In addition, the shaft bearing 700 may be a bearing such as a ball bearing or a needle bearing, and the rolling element 720 of the shaft bearing 700 is supported by the drive shaft 500, and the outer ring 710 of the shaft bearing 700 is supported by the small diameter portion 400b of the boot 400 through the bearing housing 600.

In addition, the shaft seal 800 is installed between the bearing housing 600 and the drive shaft 500 at the end of the small diameter portion 400b of the boot 400, so that foreign matters can be blocked from being introduced into the boot 400 by the shaft seal 800.

For reference, although a drag torque may be affected by the shaft seal 800, due to the characteristics of the position and size of the shaft seal 800, the diameter of the shaft seal 800 is formed to be relatively much shorter than that of a bearing inner seal mounted on the wheel bearing 200. Accordingly, since a level at which the drag torque increases is not larger than that of the bearing inner seal, the influence on fuel efficiency is not large.

Figure 4:
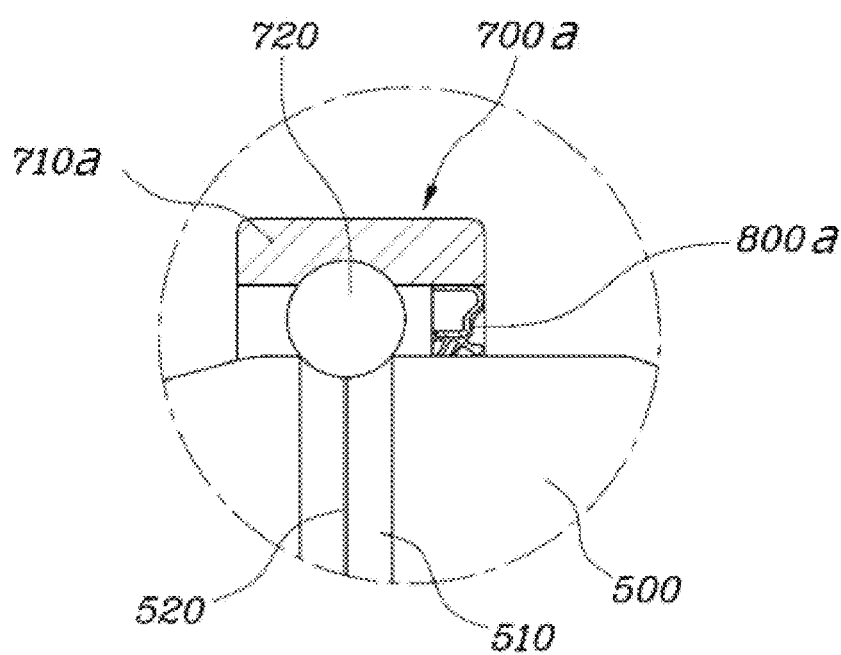
FIG. 4 is a view showing an assembly structure of another example of a shaft seal according to the present disclosure.

In addition, FIG. 4 shows an assembly structure of another example of the shaft seal 800a according to the present disclosure, and the shaft seal 800*a* may be assembled between the outer ring 710*a* of the shaft bearing 700*a* and the drive shaft 500.

For example, the bearing housing 600 is press-fitted and assembled to the inner circumferential surface of the small diameter portion 400*b* of the boot 400.

In addition, the shaft bearing 700*a* may be a bearing such as a ball bearing or a needle bearing, and the rolling element 720 of the shaft bearing 700*a* is supported by the drive shaft 500, and the outer ring 710*a* of the shaft bearing 700*a* is supported at the end of the small diameter portion 400*b* of the boot 400 through the bearing housing 600.

In particular, the shaft seal 800*a* is built-in and installed between the outer ring 710*a* of the shaft bearing 700*a* and the drive shaft 500 that are positioned at the inboard side, so that foreign matters can be blocked from being introduced into the boot 400 by the shaft seal 800*a*.

Meanwhile, according to the present disclosure, as the boot 400 is assembled to the knuckle 300, the boot 400 may be connected to the outer ring 210 of the wheel bearing 200.

FIG. 1 shows a structure in which the knuckle 300 is fixed to the outer ring 210 of the wheel bearing 200; and the large diameter portion 400*a* of the boot 400 is assembled to the knuckle 300.

For example, an inner circumferential surface of one end of the knuckle 300 positioned at the outboard side of the inner circumferential surface of the knuckle 300 is assembled in a shape that surrounds a part of the outer ring 210 of the wheel bearing 200.

In addition, the outer circumferential surface of the large diameter portion 400*a* of the boot 400 is press-fitted and assembled to the inner circumferential surface of the other end of the knuckle 300 positioned at the inboard side of the inner circumferential surface of the knuckle 300.

At this time, the knuckle 300 is provided in a shape that covers between the outer ring 210 and the inner ring 220 of the wheel bearing 200, so that it is possible to prevent external foreign matters from being introduced into the wheel bearing 200 through a space between the outer ring 210 and the inner ring 220, thereby removing the existing bearing inner seal. Accordingly, it is possible to improve fuel efficiency by reducing the drag torque due to the bearing inner seal.

Figure 5:
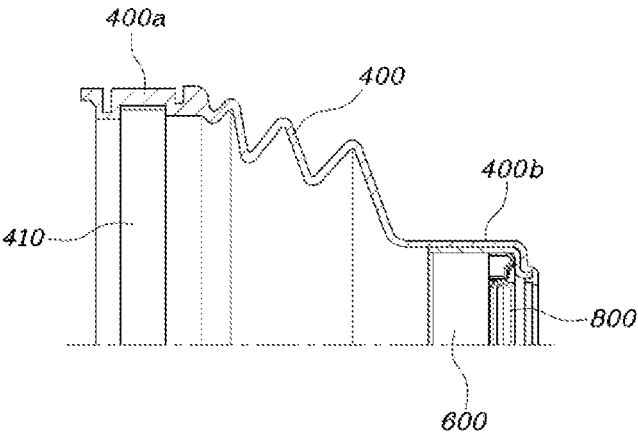
FIG. 5 is a view showing a form in which the shaft seal is assembled to a boot according to the present disclosure.

For reference, as shown in FIG. 5, a band 410 configured to provide tension in the outer radial direction is fastened to the inner circumferential surface of the large diameter portion 400*a* of the boot 400, so that it is possible not only to improve assemblability of the boot 400 by fastening the large diameter portion 400*a* of the boot 400 to the inner circumferential surface of the knuckle 300 by the band 410, but also to improve workability according to replacement and repair by easily attaching or detaching the boot 400.

In addition, the shaft seal 800 together with the bearing housing 600 is assembled in the boot 400 on the inner circumferential surface of the small diameter portion 400*b* of the boot 400, so that the boot assembly may be integrally configured.

Meanwhile, in the present disclosure, as shown in FIG. 2, a ratio of the length of a pitch circle diameter (PCD) of the shaft bearing 700 to a minimum outer diameter of the drive shaft 500 may be as in Equation 1 below.

$$1.0 \leq D/d \leq 1.5 \qquad \text{Equation 1}$$

D: PCD of the shaft bearing 700
d: Minimum outer diameter of the drive shaft 500
According to this numerical range, a diameter of a part of the drive shaft 500 that supports the ball is formed to be larger than a diameter of the remaining portion of the drive shaft 500 to increase the stiffness of the drive shaft 500, so that it is possible to prevent the drive shaft 500 from being broken or damaged by the pressure of the ball.

Subsequently, in the present disclosure, as shown in FIG. 2, a ratio of a length from an end of an outboard side of the shaft bearing 700 up to a center of the rolling element 720 of the shaft bearing 700 to a length from an inflection point of an outer diameter of an outboard side of the drive shaft 500 to which the shaft bearing 700 is assembled up to the center of the rolling element 720 of the shaft bearing 700 may be as in Equation 2 below.

$$0.75 \leq B/b \leq 1.0 \qquad \text{Equation 2}$$

B: Length from the end of the outboard side of the shaft bearing 700 up to the center of the rolling element 720 of the shaft bearing 700
b: Length from the inflection point of the outer diameter of the outboard side of the drive shaft 500 to which the shaft bearing 700 is assembled up to the center of the rolling element 720 of the shaft bearing 700

According to this numerical range, the same diameter section of the drive shaft 500 to which the shaft bearing 700 is assembled is formed to be at least longer than or equal to the outer ring 710 of the shaft bearing 700, so that it is possible to improve the ability to assemble by easily seating and assembling the ball of the shaft bearing 700 in the orbit 510 of the drive shaft 500.

Meanwhile, the shaft bearing 700 according to the present disclosure is a ball bearing having a shape in which the inner ring has been removed, and the ball of the shaft bearing 700 is assembled in a state of being seated in the orbit 510 formed on the drive shaft 500 and thus the shaft bearing 700 and the drive shaft 500 are integrally configured.

As described above, in the present disclosure, the inner ring of the shaft bearing 700 is removed and the orbit 510 formed on the drive shaft 500 replaces the inner ring, so that it is possible to reduce the outer diameter of the shaft bearing 700 by the length at which the inner ring is removed.

Accordingly, the shaft bearing 700 may increase the maximum bending angle of the constant velocity joint by increasing the bending angle at which the shaft bearing 700 interferes with the surrounding parts, and make an assembly structure of a shaft seal 800 compact together with the shaft bearing 700.

In addition, as the inner ring of the shaft bearing 700 is removed, it is possible to reduce the cost and weight of the axle assembly by reducing the number of parts.

The boot 400 does not rotate when the drive shaft 500 is rotated, so that an operation in which the wrinkle of the boot 400 is continuously folded and unfolded in the circumferential direction in a traveling situation does not occur, thereby preventing a frictional noise generated from the wrinkle portion while traveling.

Meanwhile, although the present disclosure has specifically described the above specific examples, it is apparent to those skilled in the art that various changes and modifications are possible without departing from the technical spirit scope of the present disclosure, and it goes without saying that these changes and modifications belong to the appended claims.

What is claimed is:
1. A drive axle assembly comprising:
a wheel bearing assembled to an axle housing;
a boot having a large diameter portion of one end connected to an outer ring of the wheel bearing;

a drive shaft having an orbit formed along a circumferential direction of an outer circumferential surface; and a shaft bearing assembled between a small diameter portion of the other end of the boot and the drive shaft, and configured to restrict the rotation of the boot as a rolling element is rotated along the orbit;

wherein a shaft seal is assembled to an inboard side of the shaft bearing to block foreign matters from being introduced into the boot;

wherein the shaft seal is assembled between the small diameter portion of the other end of the boot and the drive shaft;

wherein the rolling element of the shaft bearing comes into direct contact with the orbit.

2. The drive axle assembly of claim 1, wherein the orbit is formed on the drive shaft in a groove shape.

3. The drive axle assembly of claim 1, wherein the orbit is formed on the drive shaft in a groove shape corresponding to a shape of an outer surface of the rolling element.

4. The drive axle assembly of claim 1, wherein a lubrication groove is formed along the orbit.

5. The drive axle assembly of claim 4, wherein the lubrication groove is formed in a straight shape along the orbit.

6. The drive axle assembly of claim 1, wherein the shaft seal is assembled between an outer ring of the shaft bearing and the drive shaft.

7. The drive axle assembly of claim 1, wherein a knuckle is fixed to the outer ring of the wheel bearing, and the large diameter portion of the boot is assembled to the knuckle.

8. The drive axle assembly of claim 1, wherein a ratio of a length of a pitch circle diameter (PCD) of the shaft bearing to a minimum outer diameter of the drive shaft is as in Equation 1 below, $$1.0 \leq D/d \leq 1.5 \qquad \text{Equation 1}$$

wherein d is a minimum outer diameter of the drive shaft, and wherein D is a PCD of the shaft bearing.

9. The drive axle assembly of claim 1, wherein a ratio of a length from an end of an outboard side of the shaft bearing up to a center of the rolling element of the shaft bearing to a length from an inflection point of an outer diameter of the outboard side of the drive shaft to which the shaft bearing is assembled up to the center of the rolling element of the shaft bearing is as in Equation 2 below, $$0.75 \leq B/b \leq 1.0 \qquad \text{Equation 2}$$

wherein B is a length from the end of the outboard side of the shaft bearing up to the center of the rolling element of the shaft bearing, and wherein b is a length from the inflection point of the outer diameter of the outboard side of the drive shaft to which the shaft bearing is assembled up to the center of the rolling element of the shaft bearing.

10. A drive axle assembly comprising:

a wheel bearing assembled to an axle housing;

a boot having a large diameter portion of one end connected to an outer ring of the wheel bearing;

a drive shaft having an orbit formed along a circumferential direction of an outer circumferential surface; and a shaft bearing assembled between a small diameter portion of the other end of the boot and the drive shaft, and configured to restrict the rotation of the boot as a rolling element is rotated along the orbit;

wherein a shaft seal is assembled to an inboard side of the shaft bearing to block foreign matters from being introduced into the boot;

wherein the shaft seal is assembled between the small diameter portion of the other end of the boot and the drive shaft;

wherein a lubrication groove is formed along the orbit.

11. The drive axle assembly of claim 10, wherein the rolling element of the shaft bearing comes into direct contact with the orbit.

12. The drive axle assembly of claim 10, wherein the orbit is formed on the drive shaft in a groove shape corresponding to a shape of an outer surface of the rolling element.

13. The drive axle assembly of claim 10, wherein the lubrication groove is formed in a straight shape along the orbit.

14. The drive axle assembly of claim 10, wherein a knuckle is fixed to the outer ring of the wheel bearing, and the large diameter portion of the boot is assembled to the knuckle.

15. A drive axle assembly comprising:

a wheel bearing assembled to an axle housing;

a boot having a large diameter portion of one end connected to an outer ring of the wheel bearing;

a drive shaft having an orbit formed along a circumferential direction of an outer circumferential surface; and a shaft bearing assembled between a small diameter portion of the other end of the boot and the drive shaft, and configured to restrict the rotation of the boot as a rolling element is rotated along the orbit;

wherein a shaft seal is assembled to an inboard side of the shaft bearing to block foreign matters from being introduced into the boot;

wherein the shaft seal is assembled between the small diameter portion of the other end of the boot and the drive shaft, wherein a knuckle is fixed to the outer ring of the wheel bearing, and the large diameter portion of the boot is assembled to the knuckle.

16. The drive axle assembly of claim 15, wherein the orbit is formed on the drive shaft in a groove shape corresponding to a shape of an outer surface of the rolling element.

17. The drive axle assembly of claim 15, wherein the rolling element of the shaft bearing comes into direct contact with the orbit.

18. The drive axle assembly of claim 15, wherein a lubrication groove is formed along the orbit.

19. The drive axle assembly of claim 18, wherein the lubrication groove is formed in a straight shape along the orbit.

* * * * *